United States Patent

[11] 3,602,747

[72] Inventors Viktor Stroppa
 Gerlingen;
 Kurt Zimmerman, Boblingen, both of,
 Germany
[21] Appl. No. 884,637
[22] Filed Dec. 12, 1969
[45] Patented Aug. 31, 1971
[73] Assignee Robert Bosch GmbH
 Stuttgart, Germany
[32] Priority Dec. 13, 1968
[33] Germany
[31] P 18 14 387.8

[54] CURRENT GENERATOR WITH FRACTIONAL SLOT WINDING
 6 Claims, 9 Drawing Figs.
[52] U.S. Cl. .................................................. 310/68 D,
 310/114, 310/188, 310/263
[51] Int. Cl. .................................................. H02k 3/28
[50] Field of Search .......................................... 310/188,
 263, 111, 68, 68.3, 68.4, 165, 112, 113, 114, 171

[56] References Cited
 UNITED STATES PATENTS

| | | | |
|---|---|---|---|
| 3,010,040 | 11/1961 | Braun............................ | 310/112 |
| 2,692,956 | 10/1954 | Kalzor et al..................... | 310/113 X |
| 3,041,484 | 6/1962 | Freer et al. ...................... | 310/68 |

FOREIGN PATENTS

| | | | |
|---|---|---|---|
| 673,691 | 6/1952 | Great Britain................. | 310/111 |

OTHER REFERENCES

Charles S. Siskind, Induction Motors, McGraw Hill Book Co., New York, N.Y. 1958, pp. 184– 206, Chpt. 7.

Primary Examiner— D. F. Duggan
Assistant Examiner— B. A. Reynolds
Attorney— Michael S. Striker ABSTRACT: A current generator in which rectifying diodes are provided in the stator for rectifying the output current of the generator. The rotor carries an excitation winding and further rectifying diodes which energize the excitation winding from an auxiliary machine rotating with the rotor. An alternating current winding constructed in the form of fractional slot winding is carried by the auxiliary machine and is influenced by a direct current stator winding. A voltage regulator connected to the output of the generator supplied current to the stator winding.

INVENTORS
Viktor STROPPA
Kurt ZIMMERMANN
By their ATTORNEY

PATENTED AUG 31 1971
3,602,747
SHEET 3 OF 5
FIG. 4
FIG. 5
FIG. 6
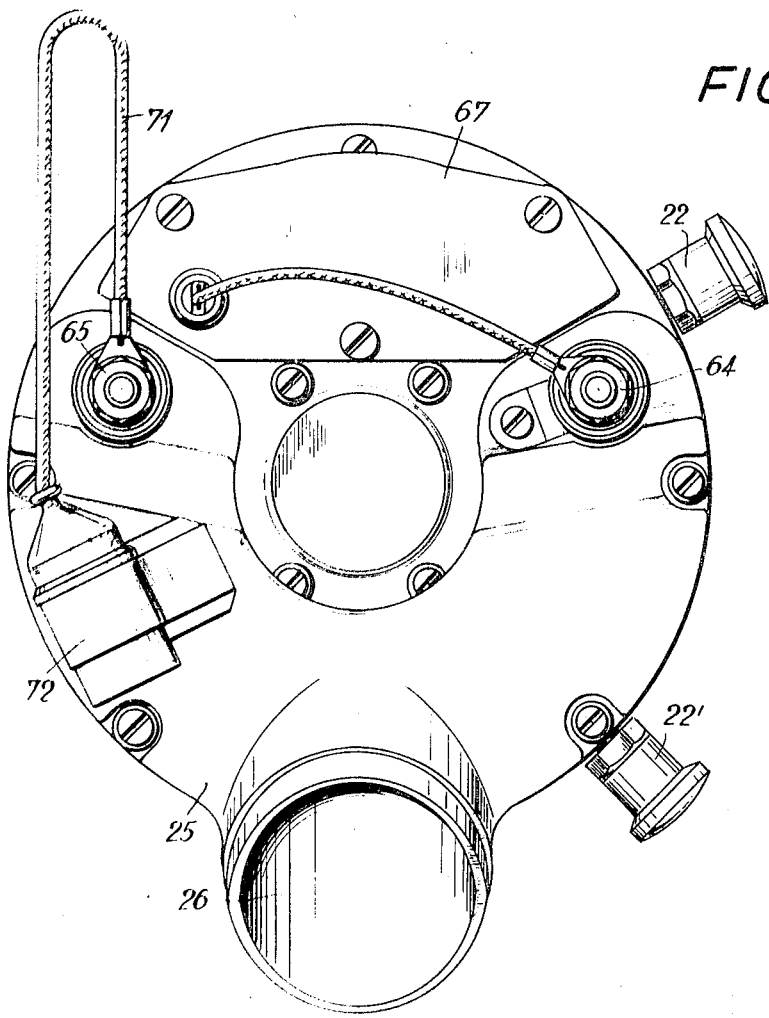
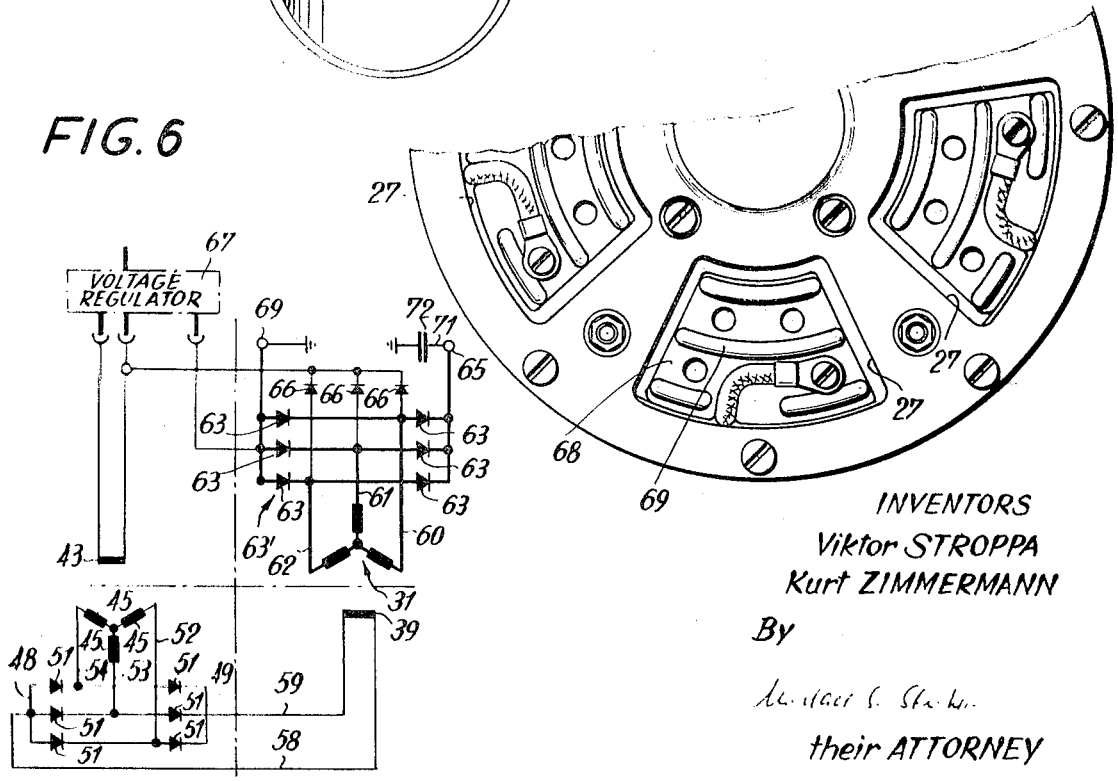
INVENTORS
Viktor STROPPA
Kurt ZIMMERMANN
By
their ATTORNEY 0.5ms/UNIT    n=4000 RPM 0.5ms/UNIT    n=4000 RPM INVENTORS
Viktor STROPPA
Kurt ZIMMERMANN
BY their ATTORNEY 3,602,747

CURRENT GENERATOR WITH FRACTIONAL SLOT WINDING

BACKGROUND OF THE INVENTION

The present invention relates to a brushless current generator used particularly for motor vehicles. This current generator contains within its stator rectifiers for the output current. An excitation winding is upon the rotor of this generator which is fed or energized from an auxiliary machine acting as an exciter machine through rectifiers rotating with the rotor. The rotating alternate current winding of the exciter machine is influenced through a direct current winding in the stator, and this winding in the stator is fed or energized through voltage regulator via rectifiers from the stator winding which delivers the output current of the generator. Such current generator is known in the art in the form of different designs and embodiments.

Thus, the exciter machine can be in the form of an air gap transformer in which the primary winding is that winding within the stator which is energized with alternating current from the stator winding which provides the output current. The secondary winding of this transformer, on the other hand, forms the alternating current winding of the rotor. In this design, the exciter machine serves only the purpose to transfer the excitation power to the rotor in place of slip rings. A conversion of mechanical energy into electrical energy does not take place within the auxiliary machine. The full excitation power must be taken from the output current.

In another embodiment, the exciter machine is in the form of a single-phase current generator which has a stator winding energized from the output current delivered by the stator winding through rectifying means. Since the exciter machine amplifies or magnifies the current taken from the output flow, the main generator can be correspondingly constructed as a smaller and lower powered unit.

In a still further embodiment, the exciter machine is constructed in the form of a polyphase generator. Such a unit can be constructed smaller and in simpler form than a single-phase current generator, for equal power output. Aside from this, such polyphase generator has the particular advantage that the secondary voltage delivered from it is substantially less wavy after rectification, than for the corresponding case involving a single-phase machine. This embodiment requires a higher number of diodes, but such polyphase machine is preferred because of the more uniform voltage applied to the excitation winding.

The different forms of the exciter machine can be assembled with a single pole or claw-shaped pole machine as main generator.

The conventional embodiments known in the art have a significant disadvantage. Through the cooperation of the commutation process of the rectifying diodes with the inductance of the excitation winding of the main generator voltage spike appear in the rectified excitation current. These voltage spikes can destroy the rotating rectifying diodes, and consequently it is necessary that these diodes be designed to carry such high voltage spikes. The undesired voltage spikes can be eliminated in the conventional manner, by providing a capacitor across the diodes. This capacitor must be heat resistant, and must be large corresponding to the high voltage to be applied across it. As a result, such capacitor is difficult to arrange on the rotor. It is also possible to bridge these diodes through a resistor, and thereby reduce the voltage spikes. However, the size and weight of the resistor gives rise to difficulties. Furthermore, the electrical power required by the resistors is dissipated in the form of heat, and requires a corresponding larger current generator which is subjected to a larger heat load.

It is the object of the present invention to eliminate the voltage spikes which appear in the excitation winding of the main generator in the conventional embodiments of the exciter machine, and to avoid, thereby, the disadvantages enumerated above. This is achieved, in accordance with the present invention, through the arrangement that the rotating alternating current winding of the exciter machine is wound in the form of a conventional fractional slot winding.

In the applications known in the art, the generated alternating current, such, is not applied to the output terminals through rectifiers. In these cases, the fractional slot winding has the task to suppress the harmonics of the voltage generated by machine, through corresponding arrangement of the winding and to realize, thereby, a sinusoidal function as close as possible of the delivered voltage. Surprisingly, the fractional slot winding effects to reduce to normal values the periodically appearing magnified voltages, resulting not from the current generator but from the very special case of a load consisting in the cooperation between the commutation processes in the rotating rectifier diodes and the high inductance of the excitation winding of the main generator. The rectified voltage delivered by the exciter machine thereby obtains a more uniform character. In contrast to the conventional applications, furthermore, the voltage generated by the exciter machine has a substantially high upper harmonic content.

From the viewpoint of the winding technology, it is particularly advantageous to construct the fractional slot winding of the rotating alternating current winding of the exciter machine, so that the product $q \times m$, where $q$ is the number of slots per pole and phase, $m$ is the number of phases of the machine, is a full integer and a proper fraction $n/d$, where $n$ is the numerator and $d$ the denominator, and that the numerator $n$ within the region $d/2 \leq n < d$ differs from the value of the denominator by 1 or 2, and assumes the value of 1 or 2 within the region $1 \leq n \leq d/2$.

In order to save copper, it is desirable to arrange the winding short-pitched.

SUMMARY OF THE INVENTION

A current generator in which a stator is provided with an alternating current winding and rectifying diodes for rectifying the output current derived from the stator winding. The output current is used to drive the load of the generator. A rotor within the generator is mounted on a shaft held in one ball bearing and one roller bearing retained in end cap members secured to the housing of the generator. An excitation winding is on the rotor as well as rectifying diodes which rotate with the rotor. An auxiliary machine rotating with the energizes the excitation winding on the rotor through the rectifying diodes that rotate with the rotor. An alternating current winding on the rotor of the auxiliary machine is influenced by a direct current winding on the stator, and is wound in the form of a fractional slot winding. A voltage regulator is connected to the output of the generator and energizes the direct current stator winding of the auxiliary exciter machine with the output current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a side view taken in the direction of IV in FIG. 1;

FIG. 5 is a side view of FIG. 4 with the air suction cover of the generator removed;

FIG. 6 is a circuit diagram of the current generator with auxiliary exciter machine;

DESCRIPTION OF THE PREFERRED EMBODIMENTS

Figure 1:
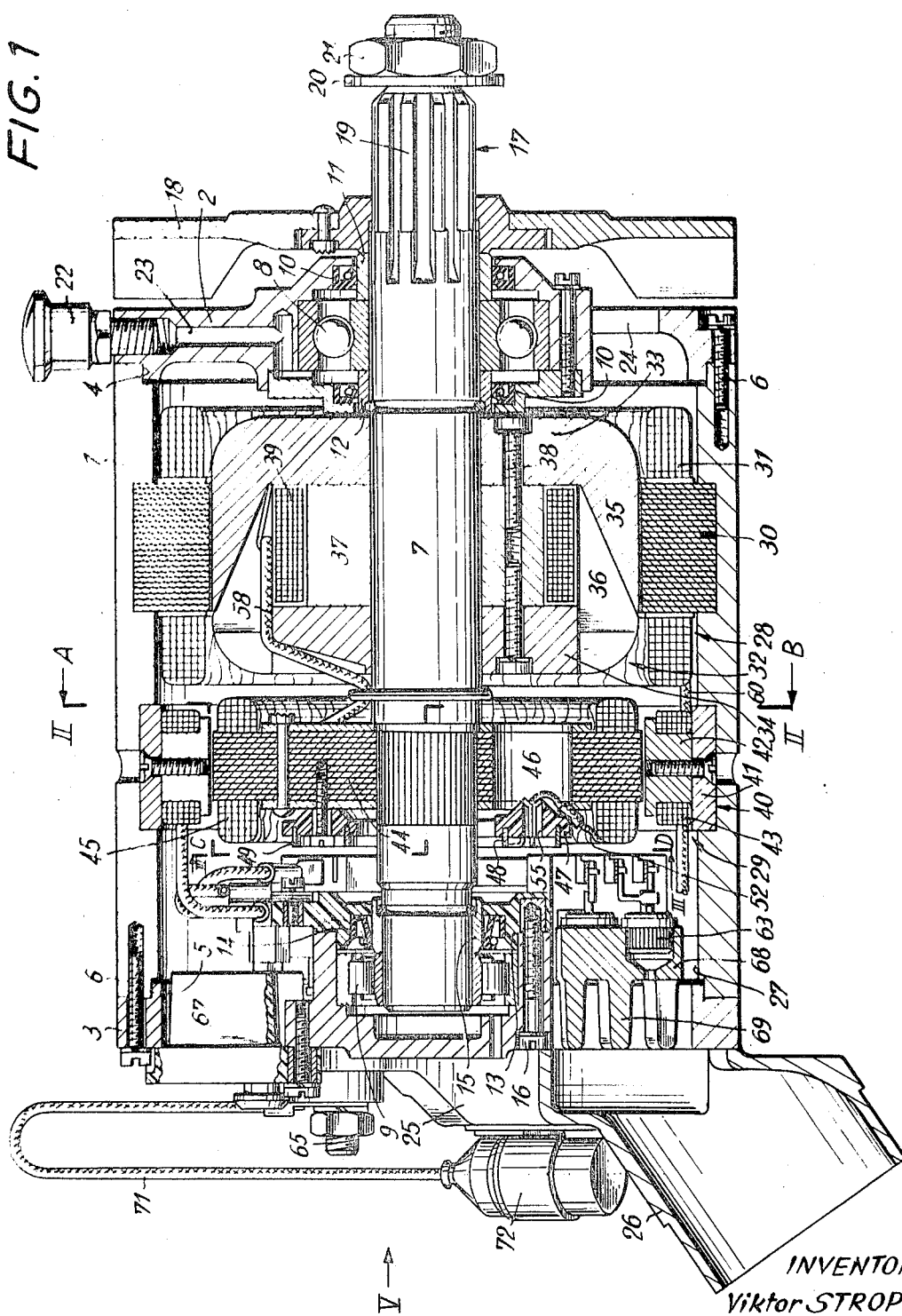
FIG. 1 is a cross-sectional view of the current generator through the longitudinal axis, in accordance with the present invention.

Referring to the drawing, the current generator has essentially a cylindrical housing 1 made of lightweight metal. The housing is closed at both of its ends, through two bearing caps 2 and 3. The bearing cap members are mated to the housing through steps 4 and 5, and are secured by means of screws 6. A shaft 7 is rotatably held within the bearing cap member 2 through a ball bearing 8. A roller bearing 9 supports the shaft within the bearing cap member 3. A sealing ring member 10 is provided on each side of the ball bearing 8 within the bearing cap member 2. The sealing rings 10 seal against the rings 11 and 12 mounted on both sides of the inner ring of the ball bearing and fixed to the shaft, so that they rotate with the shaft. The space within the bearing cap member 3 and occupied by the roller bearing 9, is sealed from the outside or exterior through the bearing cap member 3. A plate 13 made of synthetic material, borders the roller bearing 9 on the inside. A sealing ring 14 is arranged within the plate 13. This sealing ring 14 seals against a ring 15 which is mounted upon the shaft and rotates therewith. The plate 13 of synthetic material is secured to the bearing cap member 3 through screws 16.

The shaft 7 projects from the side of the bearing cap member 2 with the shaft end-portion 17 out of the current generator. Exterior to the bearing cap member 2, this end portion of the shaft carries a cooling member or fan 18. The end portion of this shaft is also provided with a splined profile upon which a belt pulley or a coupling may be mounted thereon. A disc 20 and a hexagonal nut 21 is provided for such mounting purposes on the end portion of the shaft. A grease reservoir 22 is provided within the bearing cap member 2, and supplies the ball bearing 8 with grease through greasing ducts or channels 23. A grease reservoir 22' is provided in the bearing cap member 3, and provides similarly grease to the roller bearing 9. Four openings 24 within the cap member 2 permit the fan 18 to evacuate the heated air from the interior of the current generator. An air suction cover 25 is arranged on the cap member 3. Fresh air sucked through an air intake port 26 is distributed through the lower half of the bearing cap member 3, by means of the air suction cover 25. The sucked-in air can then enter the interior of the housing 1 through three openings 27 in the cap member 3.

A main generator 28 is arranged within the housing 1 and in proximity with the bearing cap member 2, whereas an excitation machine 29 is arranged within the proximity of the bearing cap member 3 in the housing 1. The main generator has a laminated stator core 30 and a stator winding 31 which are fixed within the housing 1. A rotor 32 is arranged on the shaft 7 within the stator core 30. The rotor has two discs 33 and 34 spaced from each other on the shaft. The discs 33 and 34 carry claws 35 at their circumference or periphery, and these claws are bent substantially parallel with the shaft axis. The claws of one disc reach into the gaps 36 formed between the claws of the other disc, while, at the same time, not contacting these claws of the other disc. A cylindrical member 37 is slipped onto the shaft 7 between the discs 33 and 34, and consists of a single element of iron, similar to the discs 33 and 34. Screws 38 are used to secure both discs to the cylindrical member 37 upon which an excitation winding 39 is provided.

The excitation machine 29 has a stator 40 comprising a steel ring 41, cast integral with the housing 1 made of lightweight metal, and ten iron poles 42 screwed to the steel ring 41 from the inside. Each of the poles 42 carries a winding 43. Within the stator pole, a laminated rotor core 44 is pressed onto the shaft 7. The laminated rotor core carries a rotor winding 45 which is designed in the form of a fractional slot winding, as shown in the winding diagram of FIG. 7.

In the laminated rotor core are six uniformly distributed cylindrical openings 46. In front of these openings, the rotor core 44 carries a bridge 47 made of synthetic material on the side facing the bearing cap member 3. On the bridge made of synthetic material a cylindrically shaped inner current track 48 and a similarly shaped outer current track 49 are arranged concentrically with the shaft 7 on the side facing the bearing cap member 3.

Figure 2:
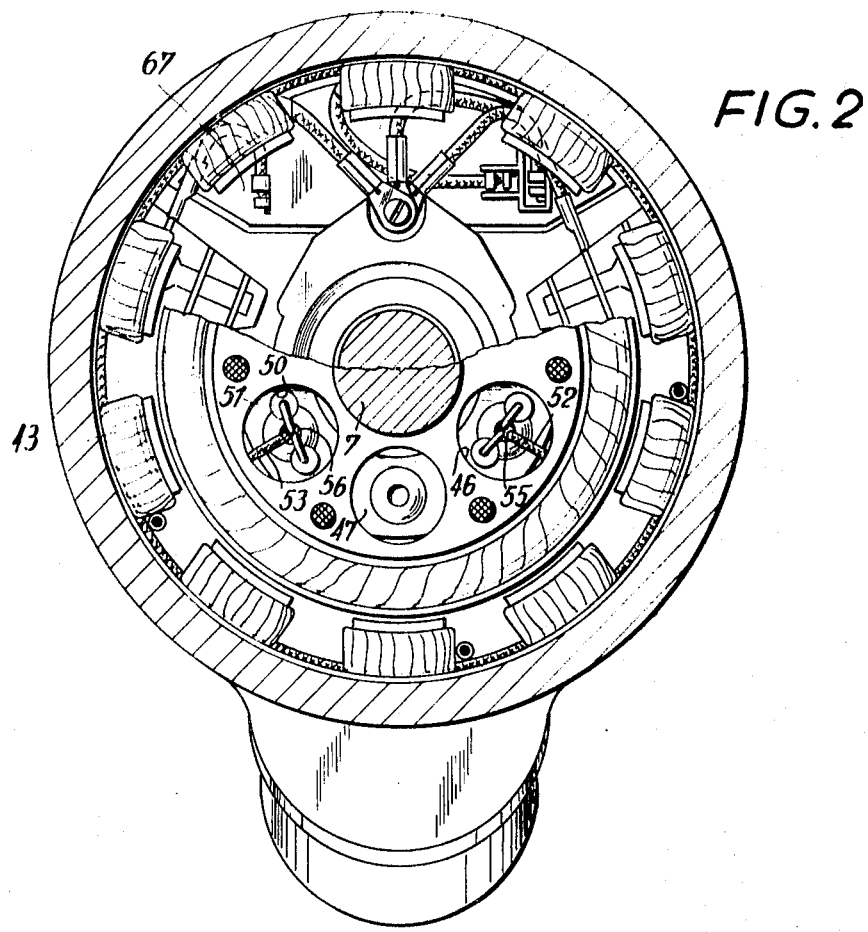
FIG. 2 is a cross-sectional view taken along line II—II in FIG. 1.
Figure 3:
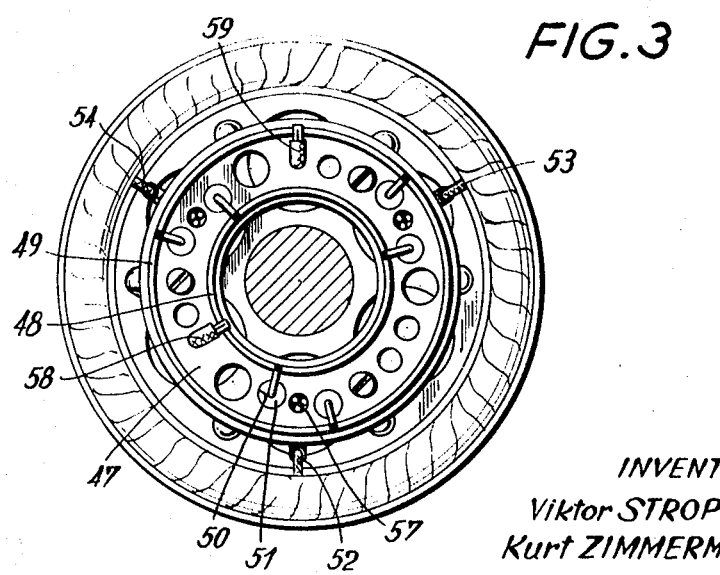
FIG. 3 is a cross-sectional view taken along line III—III in FIG. 1.

Six rectifying diodes 51 are arranged between the current tracks or currents rings 48 and 49, and within bores 50 directed parallel to the axis of the shaft and in the bridge 47. Each of these diodes have a connecting wire at the frontal surface thereof. The diodes 51 are of alternating polarity, so that when moving along the circumference, terminal wires of negative and positive polarity emerge from the bores 50 in the bridge 47. Three connecting lines 52, 53 and 54 of the rotor winding of the excitation machine lead to three openings 55, 56 and 57 arranged parallel to the axis and in the bridge 47 of synthetic material. The terminal wires of the diodes 51 facing the main generator are also led to the openings 55, 56 and 57, and are soldered each with one of the terminal wires 52, 53 and 54 within these openings, as shown in FIGS. 2 and 6. The terminal wires of the diodes 51 looking away from the main generator, are connected with the current tracks, so that the anode terminals are connected to the inner current track 48, and the cathode terminals are connected to the outer current track 49 through soldered joints.

The inner current track 48 and the outer current track 49 are connected through junctions 58 and 59, with the rotating field winding 39 of the main generator. The stator winding 31 of the main generator 28, is connected through three connecting lines 60, 61 and 62 via a power rectifier 63', which is made of six diodes 63, to a negative terminal 64 and a positive terminal 65.

Through three further rectifying diodes 66 and a voltage regulator 67 (see e.g. U.S. Pat. Ser. No. 3,447,065), the armature winding 31 of the stator of the main generator is connected with the field winding 43 of the stator of the excitation machine, as shown in FIG. 6. The six rectifying diodes 63 and the three diodes 66 are arranged in three metallic cooling members 68 holding three of these elements. These cooling members 68 are provided with cooling ribs or fins 69, and are suspended in each of the openings 27 of the bearing cap member 3 through a synthetic member, not shown. The cooling members are arranged so that they are circulated on all sides by the cooling air sucked in through the port 26.

At the positive terminal 65, a capacitor 72 is connected through a junction line 71, for the purpose of reducing voltage spikes, and of radio interference suppression.

Through the application of separate diodes 63 and 66 for the current delivered from the generator and for the feeding of the excitation winding 43, of the excitation machine respectively, the positive terminal of the excitation winding of the excitation machine is galvanically separated from the positive terminal 65 of the power rectifier 63'. Through this arrangement, the possibility is avoided that a motor vehicle battery becomes discharged through the excitation winding of the excitation machine, when connected to the positive terminal 65.

Figure 7:
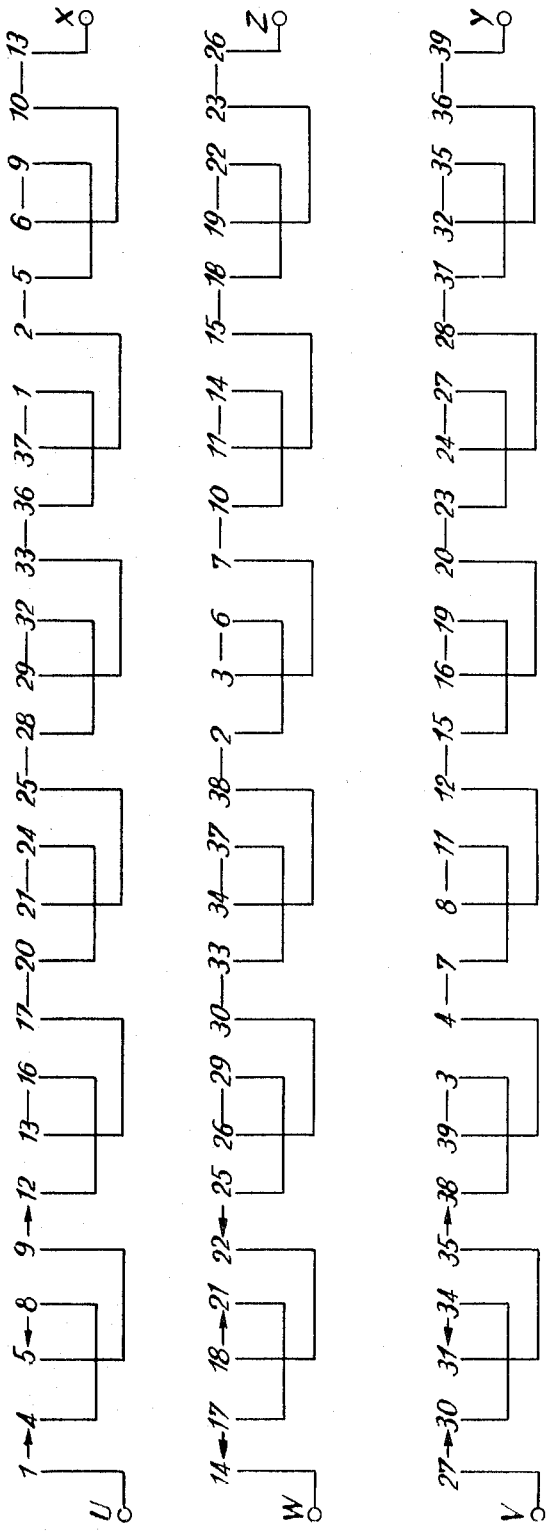
FIG. 7 is a winding diagram for the rotor winding of the excitation machine, in accordance with the present invention.

FIG. 7 shows the construction and arrangement of the fractional slot winding of the rotor of the excitation machine. The rotor of this excitation machine has 39 slots, the stator has 10 poles corresponding to five pairs of poles, whereby the number of slots for each pole and phase is given by $q=39/10 \times 3=1.3$. The fractional slot winding of this machine is designed with a winding factor of 0.891.

Figure 8:
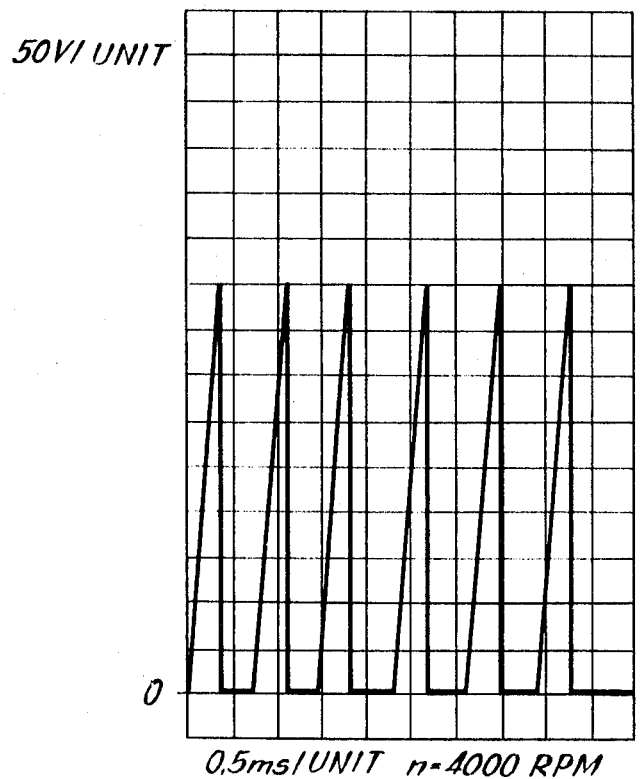
FIG. 8 is a graphical representation of the voltage function of the excitation auxiliary machine without fractional slot winding.
Figure 9:
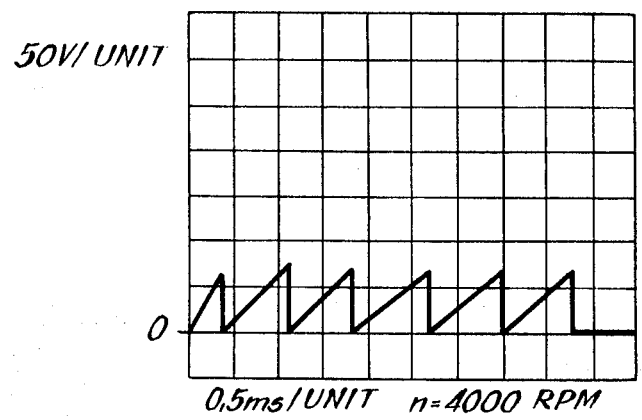
FIG. 9 is a graphical representation of the voltage function of the machine when constructed with fractional slot winding.

In the tests and experiments for realizing the results of FIGS. 8 and 9, the current generator was operated at 4000 revolutions per minute. The graphical plot in the diagram is such that the voltage delivered by the excitation machine to the field winding of the main machine, as a function of time, is plotted so that each unit of the ordinate represents 50 volts, and each unit of the abscissa represents 0.5 milliseconds. It is evident from FIGS. 8 and 9, that the voltage spikes are substantially reduced through the rotor winding of the excitation machine designed in the form of the fractional slot winding. In the current generator investigated, the voltage spikes were reduced by the ratio of 8:1.

It will be understood that each of the elements described above, or two or more together, may also find a useful application in other types of constructions differing from the types described above.

While the invention has been illustrated and described as embodied in brushless generator with excitation machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be protected by Letters Patent is set forth in the appended claims.

1. A current generator comprising, in combination, a stator with an alternating current stator winding; first diode means in said stator for rectifying the output current of said generator; a rotor; a rotatable shaft for carrying said rotor; bearing members for supporting said shaft; excitation winding means on said rotor; second diode means on said rotor; auxiliary means rotating with said rotor and energizing said excitation winding means through said second diode means, said auxiliary means having a direct current stator winding; alternating current winding means on said auxiliary means and influenced by said direct current stator winding, said alternating current winding means being a fractional slot winding with short pitch for reducing the amplitude of the voltage spikes delivered to said excitation winding means by said auxiliary means; and voltage regulating means connected to said output current of said generator and to said direct current stator winding for energizing the latter with said output current, and wherein the product of the number of phases and the number of slots per pole and per phase constitutes an integer and an actual fraction, the value of the numerator of that fraction within the range in which said numerator is at least one-half, but less than the whole, of the denominator differing by 1 or 2 from the value of the denominator, said numerator within the range in which said numerator is at least equal to 1 but is smaller than one-half of said denominator having the value 1 or 2.

2. The current generator as defined in claim 1 wherein said generator comprises a multipole machine.

3. The current generator as defined in claim 1 wherein said generator has claw-shaped poles.

4. The current generator as defined in claim 1 wherein one of said bearing members comprises a ball bearing.

5. The current generator as defined in claim 1 wherein one of said bearing members comprises a roller bearing.

6. The current generator as defined in claim 1 including greasing means for greasing said bearing members supporting said shaft.